United States Patent
Ushiyama et al.

(10) Patent No.: US 7,016,282 B2
(45) Date of Patent: Mar. 21, 2006

(54) INFORMATION RECORDING METHOD AND OPTICAL DISK UNIT

(75) Inventors: Junko Ushiyama, Kokubunji (JP); Hiroyuki Minemura, Kokubunji (JP); Makoto Miyamoto, Ome (JP)

(73) Assignee: Hitachi, Ltd., Tokyo (JP)

( * ) Notice: Subject to any disclaimer, the term of this patent is extended or adjusted under 35 U.S.C. 154(b) by 457 days.

(21) Appl. No.: 09/793,633

(22) Filed: Feb. 27, 2001

(65) Prior Publication Data

US 2002/0105875 A1 Aug. 8, 2002

(30) Foreign Application Priority Data

Dec. 7, 2000 (JP) .............................. 2000-373190

(51) Int. Cl.
*G11B 7/00* (2006.01)

(52) U.S. Cl. .................................. 369/53.3; 369/59.12
(58) Field of Classification Search ............. 369/59.12, 369/47.52, 53.3, 116; 428/644, 694
See application file for complete search history.

(56) References Cited

U.S. PATENT DOCUMENTS

| | | | | |
|---|---|---|---|---|
| 5,276,670 A | * | 1/1994 | Nogamie et al. ........... | 369/116 |
| 5,580,632 A | * | 12/1996 | Ohkawa et al. ............ | 428/64.1 |
| 5,768,245 A | * | 6/1998 | Maeda et al. ............... | 369/116 |
| 5,848,043 A | * | 12/1998 | Takada et al. .............. | 369/53.3 |
| 6,030,716 A | * | 2/2000 | Izami et al. ................. | 428/694 |
| 6,236,635 B1 | * | 5/2001 | Miyamoto et al. .......... | 369/116 |
| 6,388,978 B1 | * | 5/2002 | Ogawa et al. ............... | 369/116 |
| 6,438,085 B1 | * | 8/2002 | Kato et al. ............... | 369/59.12 |
| 6,459,666 B1 | * | 10/2002 | Yokoi ...................... | 369/47.15 |

FOREIGN PATENT DOCUMENTS

| | | |
|---|---|---|
| JP | 6-012785 | 1/1994 |
| JP | 6-089506 | 3/1994 |
| JP | 8-212691 | 8/1996 |
| JP | 10-106008 | 4/1998 |
| JP | 10-106025 | 4/1998 |
| JP | 11-296858 | 10/1999 |

OTHER PUBLICATIONS

"High Density Mark Edge Recording on a Phase Change Rewritable Disk by a 680nm Laser Diode" pp. 70-75 no date.

* cited by examiner

*Primary Examiner*—Gautam R. Patel
(74) *Attorney, Agent, or Firm*—Antonelli, Terry, Stout and Kraus, LLP.

(57) ABSTRACT

Disclosed are an information recording method and an optical disk unit that maintain a good jitter even when a line velocity is variable in a mark edge system. In the case where an erasing power when erasing a record mark at a linear velocity v1 is Pe1(mW), a recording power when forming the record mark at the linear velocity v1 is Pw1(mW), an erasing power when erasing the record mark at a linear velocity v2 faster than v1 is Pe2(mW), and a power when forming the record mark at the linear velocity v2 is Pw2 (mW), a relationship of Pw1/Pe1>Pw2/Pe2 is satisfied.

8 Claims, 7 Drawing Sheets

INFORMATION RECORDING METHOD AND OPTICAL DISK UNIT

FIELD OF THE INVENTION

The present invention relates to an optical disk unit for recording and regenerating data in a phase change disk by use of light.

BACKGROUND OF THE INVENTION

An optical disk of the ZCLV (Zone Constant Linear Velocity) format is radially divided into a plurality of zones, and recording and regeneration in each zone are carried out by the CAV (Constant Angular Velocity) system. The ZCLV system has a feature that a frequency of recording and regeneration signal is constant, and information can be densely recorded in an outer periphery in the same manner as in an inner periphery. A DVD-RAM adopts this system, and a high density in the first generation at 2.6 GB/surface and in the second generation at 4.7 GB/surface, has been realized. In this system, since the linear velocities in the inner and outer peripheries are substantially constant, when an optical head position is in the inner periphery, a disk rotation velocity is increased, and reversely when in the outer periphery, the disk rotation velocity is reduced. Accordingly, in the case of a seek, not only a movement of the optical head but also the disk rotation velocity must be controlled. For example, in the case of the optical disk having diameter of 120 mm, the disk rotation velocity when the seek is performed from radius 25 mm to radius 50 mm is ½, much time was required to control a spindle motor, and a rotation velocity control time occasionally determined a seek time. Furthermore, there occurs a problem that power consumption increases for controlling the rotation velocity of the spindle motor. In Japanese Patent Laid-Open No. 11-296858 gazette, a method is proposed for adjusting a recording power in conformity to an actual linear velocity even in the case where an actual rotation velocity cannot sufficiently follow a target rotation velocity immediately after the seek, or the like, and the linear velocity deviates from the target velocity.

If the rotation velocity is made to be substantially constant in the inner and outer peripheries, it is possible to shorten the rotation velocity control time at the time of the seek, and also to decrease power consumption required for controlling the rotation velocity of the spindle motor. Then, in order to realize a high-transfer rate when regenerating data, clock frequency in the inner periphery in which the linear velocity becomes slow is set lower, and the clock frequency in the outer periphery in which the linear velocity becomes high is set higher, whereby a system is proposed for regenerating a disk of the CLV format even when the rotation velocity is constant or changed for a small amount (Japanese Patent Laid-Open No. 06-89506 gazette, Japanese Patent Laid-Open No. 06-12785, and the like). Furthermore, as described in Japanese Patent Laid-Open No. 08-212691 gazette, a method is proposed in which the disk rotation velocity is constant when recording data, and the clock frequency of a recording signal is changed according to the linear velocity, thereby enabling a high-speed recording is proposed. In this recording method, since the linear velocity changes depending on a disk radius, there occurs a necessity of optimizing a recording condition in conformity to the linear velocity. In Japanese Patent Laid-Open No. 08-212691 gazette, Japanese Patent Laid-Open No. 10-106025 gazette and the like, the recording condition is optimized by changing a characteristic of a recording medium between the inner and outer peripheries. However, there was a problem that this recording medium is an optical disk dedicated medium for controlling the rotation velocity at the constant disk rotation velocity (or substantially constant), thus the use is restricted. As means for solving these problems, in Japanese Patent Laid-Open No. 10-106008 gazette, a method is proposed that the recording condition is not optimized by the recording medium, but a power or a pulse width when recording is changed in accordance with the linear velocity, thereby forming a record mark of an optimal shape.

Even in the ZCLV system in which the linear velocity is substantially constant, in order to attain high density, a system of changing the recording pulse width when forming the record mark is adopted. As described on page 70 in the material of The Sixth Phase Change Optical Information Storage in 1994, this is a system (adaptive type recording waveform control) of recording a recording pulse shape by increasing or decreasing at a length shorter than clock unit, depending on a preceding space and/or a succeeding space. In this system, it is possible to restrict an edge shift as low as possible due to thermal interference in a track direction generated from the record mark or space being smaller than an optical spot, which is very effective for a mark edge recording.

In the case where in a phase change disk ensured that a jitter is good (about 13% or less) as necessary and sufficient under the condition that the linear velocity is substantially constant, as shown in Japanese Patent Laid-Open No. 10-106008 gazette, the recording is made by setting the disk rotation velocity constant and changing the clock frequency of the recording signal in accordance with the linear velocity, we examined the method for recording by changing the power or the pulse width of the recording pulse in conformity to the linear velocity. As the result, by this method, the jitter was reduced to a certain recording density as necessary and sufficient, namely at about 13% or less. However, for example, in the optical disk of the high recording density like the DVD-RAM disk of 4.7 GB or more, it was understood that it is impossible to obtain the sufficient and good jitter only by unequivocally changing the power and the pulse width of the recording pulse with respect to the linear velocity. As described above, in the DVD-RAM of 4.7 GB, the adaptive control recording system is introduced in a state that the linear velocity is substantially constant. If the linear velocity is changed at the same recording density, the thermal interference condition in the track direction changes. Therefore, it was impossible to obtain the good jitter only by unequivocally controlling the pulse width or recording power.

The object of the present invention is to solve the drawbacks in the above-described prior art and to provide an optical disk unit that comprises a recording system for enabling an accurate mark edge recording in the case of an optical disk of high recording density and variable linear velocity.

SUMMARY OF THE INVENTION

The above-described objects are achieved by the information recording method according to the present invention as shown below.

(1) In the information recording method (mark edge recording) for recording information in a variable linear velocity so as to correspond the information to an edge of the record mark to be formed when an optical pulse is irradiated on a phase change disk, when a power of the optical pulse to be irradiated when erasing the record mark at a first linear velocity v1 is Pe1(mW), a power of the optical pulse to be irradiated when forming the record mark at the first linear velocity v1 is Pw1(mW), a power of the optical pulse to be irradiated when erasing the record mark at a second linear velocity v2 faster than the first linear velocity v1 is Pe2(mW), and a power of the optical pulse to be irradiated when forming the record mark at the second linear velocity v2 is Pw2(mW), Pw1/Pe1>Pw2/Pe2 is satisfied.

(2) In the information recording method for recording information in a variable linear velocity so as to correspond the information to an edge of a record mark to be formed when an optical pulse is irradiated on an optical disk, when a window width at a first linear velocity v1 is Tw1, the window width at a second linear velocity v2 faster than the first linear velocity v1 is Tw2, the pulse width of the optical pulse to be irradiated when forming the record mark at the first linear velocity v1 is P1, the pulse width of the optical pulse to be irradiated when forming the same record mark as in the first linear velocity v1, at the second linear velocity, v2 is P2, P1/Tw1<P2/Tw2 is satisfied. The window width is defined as an inverse number of the clock frequency.

(3) In the information recording method according to (1), when a window width at the first linear velocity v1 is Tw1, the window width at the second linear velocity v2 faster than the first linear velocity v1 is Tw2, the pulse width of the optical pulse to be irradiated when forming the record mark at the first linear velocity v1 is P1, and the pulse width of the optical pulse to be irradiated when forming the same record mark as in the first linear velocity v1, at the second linear velocity v2, is P2, P1/Tw1<P2/Tw2 is satisfied.

(4) In the information recording method according to (2) or (3), the shorter the record mark, the greater (P2/Tw2)−(P1/Tw1).

(5) In the information recording method for recording information in a variable linear velocity so as to correspond the information to an edge of a record mark to be formed when an optical pulse is irradiated on a phase change disk, a ratio Pw/Pe of a power Pw of the optical pulse to be irradiated when forming the record mark at each linear velocity v to a power Pe of the optical pulse to be irradiated when erasing the record mark is represented by Pw/Pe=$\gamma \times v + \gamma'$ ($\gamma, \gamma'$ are constants), and $\gamma$ is in the range of $-0.1 \leq \gamma \leq -0.01$.

Herein, the power ratio Pw/Pe of the optical pulse in each linear velocity v is represented by "Pw/Pe=$\gamma \times v + \gamma'$", and $\gamma$ is in the range of $-0.1 \leq \gamma \leq -0.01$. This is synonymous with the fact that on a graph with a transversal axis being the linear velocity v and a longitudinal axis being Pw/Pe, when the ratio Pw/Pe at each linear velocity v is plotted, an average inclination $\gamma$ of a straight line linking each plot is in the range of $-0.1 \leq \gamma \leq -0.01$.

(6) In the information recording method for recording information in a variable linear velocity so as to correspond the information to an edge of a record mark to be formed when an optical pulse is irradiated on a phase change disk, a relationship between the linear velocity v and the power Pw of the optical pulse to be irradiated when forming the record mark is represented by Pw=$\alpha \times v + \alpha'$ ($\alpha, \alpha'$ are constants), and $\alpha$ is in the range of $0.05 \leq \alpha \leq 0.5$, and a relationship between the linear velocity v and the power Pe of the optical pulse to be irradiated when erasing the record mark is represented by Pe=$\beta \times v + \beta'$ ($\beta, \beta'$ are constants), and $\beta$ is in the range of $0.1 \leq \beta \leq 0.3$.

Herein, a relationship between the linear velocity v and the power Pw of the optical pulse is represented by "Pw=$\alpha \times v + \alpha'$", and $\alpha$ is in the range of $0.05 \leq \alpha \leq 0.5$. This is synonymous with the fact that on a graph with the transversal axis being the linear velocity v and the longitudinal axis being Pw, when the Pw at each linear velocity v is plotted, an average inclination $\alpha$ of a straight line linking each plot is in the range of $0.05 \leq \alpha \leq 0.5$. Similarly, a relationship between the linear velocity v and the power Pe of the optical pulse is represented by "Pe=$\beta \times v + \beta'$", and $\beta$ is in the range of $0.1 \leq \beta \leq 0.3$. This is synonymous with the fact that on a graph that the transversal axis being the linear velocity v and the longitudinal axis being Pe, when the Pe at each linear velocity v is plotted, an average inclination $\beta$ of a straight line linking each plot is in the range of $0.1 \leq \beta \leq 0.3$.

Furthermore, the above-described objects are achieved by the optical disk unit according to the present invention as shown below.

(7) The optical disk unit for recording information so as to correspond the information to an edge of a record mark comprises: an optical head provided with a light source for irradiating light on an optical disk and an optical detector for detecting light reflected from the optical disk; optical head drive means for driving the optical head with respect to the optical disk; disk drive means for driving the optical disk for rotation; and recording waveform generating means for generating a recording waveform to drive the light source, wherein the disk drive means sets the linear velocity at a position of the optical head to be variable and drives the optical disk for rotation, and in the optical pulse to be irradiated from the light source on the optical disk, when a power of the optical pulse to be irradiated when erasing the record mark at the first linear velocity v1 is Pe1(mW), the power of the optical pulse to be irradiated when forming the record mark at the first linear velocity v1 is Pw1(mW), the power of the optical pulse to be irradiated when erasing the record mark at the second linear velocity v2 faster than the first linear velocity v1 is Pe2(mW), and the power of the optical pulse to be irradiated when forming the record mark at the second linear velocity v2 is Pw2(mW), Pw1/Pe1>Pw2/Pe2 is satisfied.

(8) The optical disk unit for recording information so as to correspond the information to an edge of a record mark comprises: an optical head provided with a light source for irradiating light on an optical disk and an optical detector for detecting lights reflected from the optical disk; optical head drive means for driving the optical head with respect to the optical disk; disk drive means for driving the optical disk for rotation; and recording waveform generating means for generating a recording waveform to drive the light source, and wherein the disk drive means sets the linear velocity at a position of the optical head to be variable and drives the optical disk for rotation, and in the optical pulse to be irradiated from the light source on the optical disk, a window width at the first linear velocity is Tw1, the window width at the second linear velocity faster than the first linear velocity is Tw2, the pulse width of the optical pulse to be irradiated when forming the record mark at the first linear velocity v1 is P1, and the pulse width of the optical pulse to be irradiated when forming the same record mark as in the first linear velocity v1, at the second linear velocity v2, is P2, P1/Tw1<P2/Tw2 is satisfied.

(9) In the optical disk unit according to (7), in the optical pulse to be irradiated on the optical disk from the light source, when the window width at the first linear velocity v1 is Tw1, the window width at the second linear velocity faster than the first linear velocity is Tw2, the pulse width of the optical pulse to be irradiated when forming the record mark at the first linear velocity v1 is P1, and the pulse width of the optical pulse to be irradiated when forming the same record mark as in the first linear velocity v1, at the second linear velocity v2, is P2, P1/Tw1<P2/Tw2 is satisfied.

(10) In the optical disk unit according to (8) or (9), the shorter the record mark, the greater (P2/Tw2)−(P1/Tw1).

(11) The optical disk unit for recording information so as to correspond the information to an edge of a record mark comprises: an optical head provided with a light source for irradiating light on an optical disk and an optical detector for detecting light reflected from the optical disk; optical head drive means for driving the optical head with respect to the optical disk; disk drive means for driving the optical disk for rotation; and recording waveform generating means for generating a signal waveform to drive the light source, wherein a ratio Pw/Pe of a power Pw of the optical pulse to be irradiated when forming the record mark at each linear velocity v to a power Pe of the optical pulse to be irradiated when erasing the record mark satisfies Pw/Pe=γ×v+γ' (γ, γ' are constants, and −0.1≦γ≦−0.01).

Herein, the power ratio Pw/Pe of the optical pulse at each linear velocity v satisfies "Pw/Pe=γ×v+γ' (−0.1≦γ≦−0.01). This is synonymous with the fact that on a graph with the transversal axis being the linear velocity v and the longitudinal axis being Pw/Pe, when the ratio Pw/Pe at each linear velocity v is plotted, an average inclination γ of a straight line linking each plot is in the range of −0.1≦γ≦−0.01.

(12) The optical disk unit for recording information so as to correspond the information to an edge of a record mark comprises: an optical head provided with a light source for irradiating light on an optical disk and an optical detector for detecting lights reflected from the optical disk; optical head drive means for driving the optical head with respect to the optical disk; disk drive means for driving the optical disk for rotation; and recording waveform generating means for generating a signal waveform to drive the light source, wherein the disk drive means sets the linear velocity at a position of the optical head to be variable and drives the optical disk for rotation, and in the optical pulse to be irradiated from the light source, the linear velocity v and the power Pw of the optical pulse to be irradiated when forming the record mark satisfy Pw=α×v+α' (α, α' are constants and 0.05≦α≦0.5), and the linear velocity v and the power Pe of the optical pulse to be irradiated when erasing the record mark satisfy Pe=β×v+β' (β, β' are constants and 0.1≦β≦0.3).

Herein, the linear velocity v and the recording power Pw for forming the record mark satisfy Pw=α×v+α' (0.05≦α≦0.5). This is synonymous with the fact that on a graph that the transversal axis being the linear velocity v and the longitudinal axis is the recording power Pw, when the Pw at each linear velocity v is plotted, an average inclination α of a straight line linking each plot is in the range of 0.05≦α≦0.5. The linear velocity v and an erasing power Pe for erasing the record mark satisfy Pe=β×v+β' (0.1≦β≦0.3). This is synonymous with the fact that on a graph that the transversal axis is the linear velocity v and the vertical axis is the erasing power Pe, when the Pe at each linear velocity v is plotted, an average inclination β of a straight line linking each plot is in the range of 0.1≦β≦0.3.

(13) In the optical disk unit according to any one of (7) to (12), the optical disk is a phase change disk.

Normally, if the linear velocity is increased, a passing time of the optical spot on the record mark of the disk is shortened. Therefore, an energy amount to be irradiated on the disk within a unit time is reduced, and the record mark becomes hard to be heated. For this reason, a laser power required for erasing is increased. Furthermore, since the clock frequency increases as the linear velocity becomes faster, the recording is performed in the recording pulse of a narrower pulse width, so that a higher recording power is required. The relationship between the linear velocity and the irradiation power is applicable to the whole of the optical disk. In the case of the phase change recording, by changing an increased amount in the erasing power and the recording power with respect to the linear velocity, the better record mark can be formed.

In the phase change recording, a recording layer is raised in temperatures up to a melting point or more, and is quickly cooled thereafter, thus forming an amorphous record mark. In a periphery of the record mark, a so-called re-crystallization region is formed in which, after the temperatures once increase up to the melting point, a crystal grows from a peripheral crystal core in a cooling process to become a crystal phase. This re-crystallization region width depends on the linear velocity at the time of recording, and it was clarified after examination that, as shown in FIG. 2, the faster the linear velocity, the narrower the width. This is because, differing from a recording principle that a mark shape of the phase change recording is determined by a temperature distribution like an optical magnetic record, the cooling process after the temperatures were increased is a more important recording principle.

Accordingly, in the case where the recording is made in the variable linear velocity, in order to obtain a certain fixed record mark width, it is necessary to consider the liner velocity dependency of the re-crystallization region width. Specifically, when the linear velocity is made faster, a fusion width of a recording film is narrowed by an amount where the re-crystallization region is narrowed. To narrow the fusion width, the recording power to be input has only to be set lower than the recording power estimated in the case of not considering the re-crystallization region. That is, when the erasing power at the first linear velocity v1 is Pe1(mW), and the recording power at the first linear velocity v1 is Pw1(mW), and the erasing power at the second linear velocity v2 faster than the first linear velocity is Pe2(mW), and the recording power at the second linear velocity v2 is Pw2(mW), the recording power Pw2' estimated in the case where the recrystallization region is not considered is represented by Pw2'=Pw1×Pe2/Pe1. However, Pw2 to be input actually is made to be smaller than Pw2' to maintain a relationship of Pw1/Pe1>Pw2/Pe2.

A relationship between the erasing power Pe and the linear velocity v is represented by Pe=β×v+β', and a relationship between the recording power Pw and the linear velocity v is represented by Pw=α×v+α'. α and β depend on a thermal structure of the disk used, a crystallization characteristic of the recording film and the like. Furthermore, a relationship between the ratio of the recording power Pw to the erasing power Pe and the linear velocity v is represented by Pw/Pe=γ×v+γ', and when γ is in the range of −0.01 to −0.1, compatibility with manufactured products is good, which is preferable. Storing means for storing a function formula that provides the irradiation power so as to optimize for such the linear velocity is mounted in the optical disk unit in the present invention, thereby carrying out a more prompt power calibration.

In the case where the linear velocity is variable, it is preferable that the adaptive recording control is performed for not only the laser power but also the pulse width corresponding to the linear velocity. The DVD-RAM having the recording density of 4.7 GB/surface adopts a system for recording by increasing and decreasing the recording pulse shape at the length shorter than the window width Tw, which is an inverse number of the clock frequency, depending on the length of the preceding space and the succeeding space. Actually, the length of a front pulse is adjusted in correspondence with the length of a space prior to each mark, whereby a shift of a front edge due to the thermal interference is controlled, and also the length of a last pulse is adjusted in correspondence with the length of a space behind the mark, whereby a shift of a rear edge due to the thermal interference is controlled. In the case of 3Tm mark, this has a shape in which the front pulse and the last pulse are integrated with each other, and recording is performed in a single recording pulse. Therefore, a rise timing and a fall timing of the recording pulse are adjusted.

When the linear velocity changes, a time when the optical spot passes with respect to one point on the disk changes. Accordingly, a thermal interference state in the track direction changes. Accordingly, when the linear velocity is changed, it is impossible to eliminate the shift at the edge position caused from the change of thermal interference only by optimizing the recording power. Furthermore, when the linear velocity accelerates, as the clock frequency corresponding to the linear velocity increases and the window width Tw shortens, a light emitting time of the pulses shortens. Therefore, influence of the rise time of a laser becomes larger. As shown in FIG. 3, since the clock frequency is low when the linear velocity is slow, influence of the rise time of the laser is small, thus obtaining the light emitting pulse close to a rectangular shape. However, when the linear velocity is fast, the clock frequency is high, and a fall time of the pulse comes before reaching an intrinsic power of the laser, so that a sufficient power may not be substantially obtained. Accordingly, it is necessary that each of variable linear velocities makes an optimal recording waveform.

The method for controlling the recording pulse width by the optical disk unit according to the present invention will be described with reference to FIG. 1. The linear velocities are considered to be the first liner velocity v1 and the second linear velocity v2 faster than the first linear velocity v1. The recording pulse width for recording the mark required at the time of the linear velocity v1 is corrected so as to be wider by setting the linear velocity as v2. Specifically, when a front pulse width of a short mark A at the first linear velocity v1 is set as FLP(v1), the front pulse width of a mark B longer than the short mark A is set as FP(v1), a last pulse width is set as LP(v1), the pulse width of the short mark A at the second linear velocity v2 is set as FLP(v2), the front pulse width of the mark B longer than the short mark A is set as FP(v2), and the last pulse width is set as LP(v2), a relationship of FLP(v1)<FLP(v2), FP(v1)<FP(v2), and LP(v1)<LP(v2) is established.

Furthermore, it is preferable that the pulse width correction is made to be larger as the record mark becomes shorter. Specifically, pulse width corrections a, a', b, b' at the second linear velocity v2 shown in FIG. 1 are set to have a>b and a'>b'. Here, a denotes a front pulse correction of the short mark A, b denotes the front pulse correction of the mark B longer than the short mark A, a' denotes a last pulse correction of the short mark A, and b' denotes the last pulse correction of the mark B longer than the short mark A (in FIG. 1, the front pulse of the short mark A is integrated with the last pulse thereof).

Still further, for controlling influences of the thermal interference, a ratio of a multipulse width between the front pulse and the last pulse to the fall width therebetween may be changed in accordance with the linear velocity. More specifically, as shown in FIG. 4, when the multi-pulse width at the first linear velocity v1 is set as MP(v1), the fall width is set as MB(v1), the multi-pulse width at the second linear velocity v2 faster than the first linear velocity v1 is set as MP(v2), and the fall width is set as MB(v2), a relationship of MP(v1)/MB(v1)≦MP(v2)/MB(v2) is established. By doing as described above, even if the linear velocity changes, the edge shift due to the change of the thermal interference is controlled, thus uniformizing the record mark width to obtain the good jitter.

DETAILED DESCRIPTION OF THE PREFERRED EMBODIMENTS

Hereinafter, embodiments of the present invention will be described with reference to the drawings.

Figure 1:
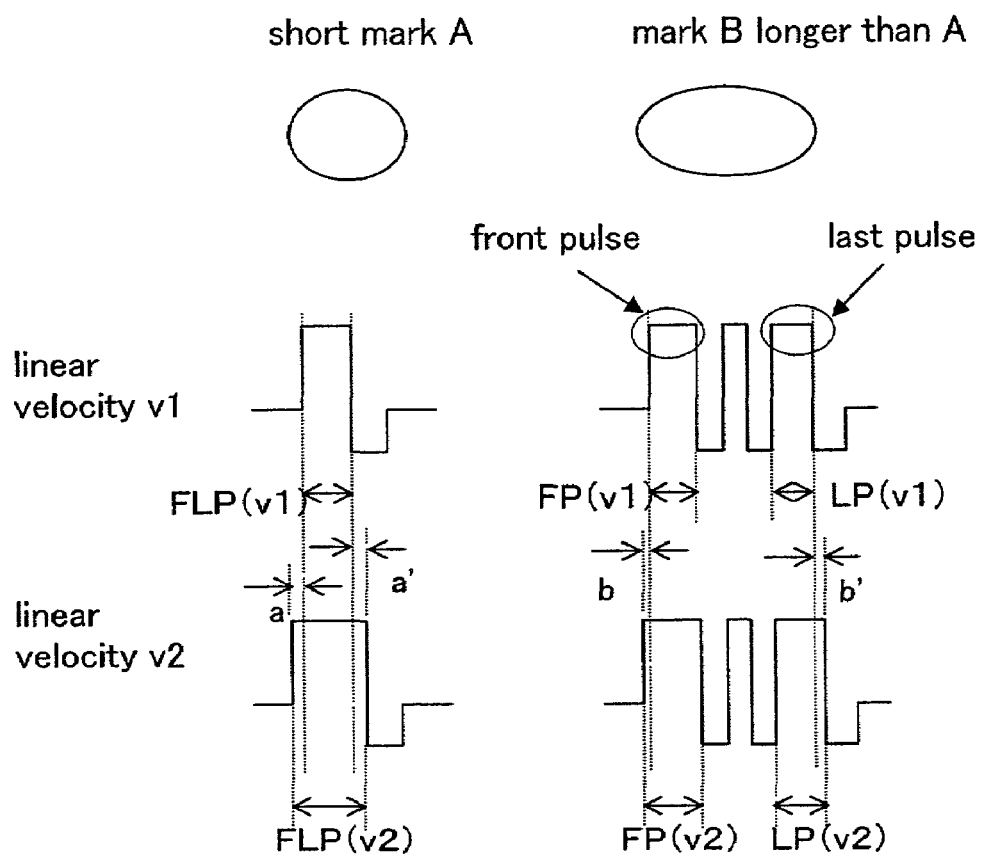
FIG. 1 is an explanatory graph in a method for correcting a recording waveform with respect to a linear velocity in the present invention.
Figure 2:
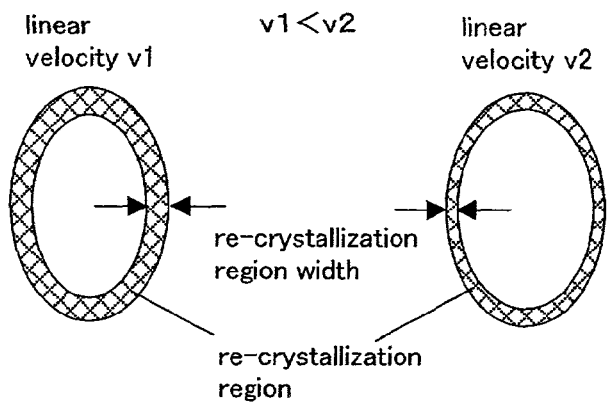
FIG. 2 is a view for explaining linear velocity dependency of a re-crystallization region width.
Figure 3:
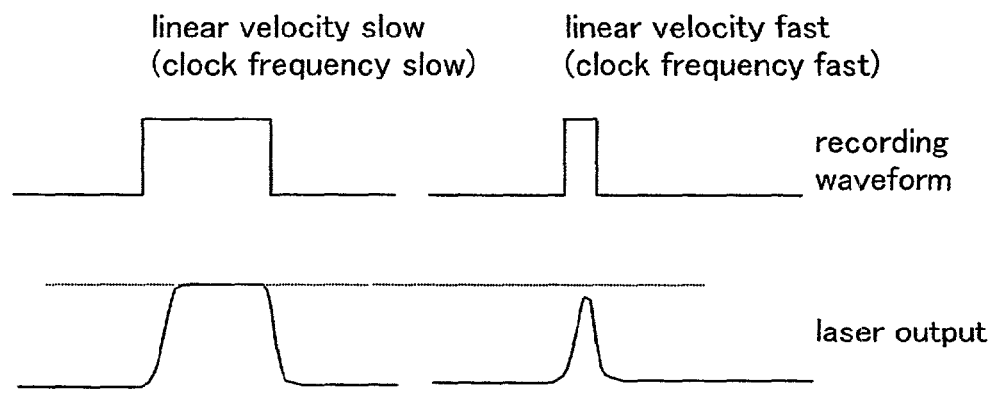
FIG. 3 is an explanatory view in a laser output according to a change of clock frequency generated when the linear velocity accelerates.
Figure 4:
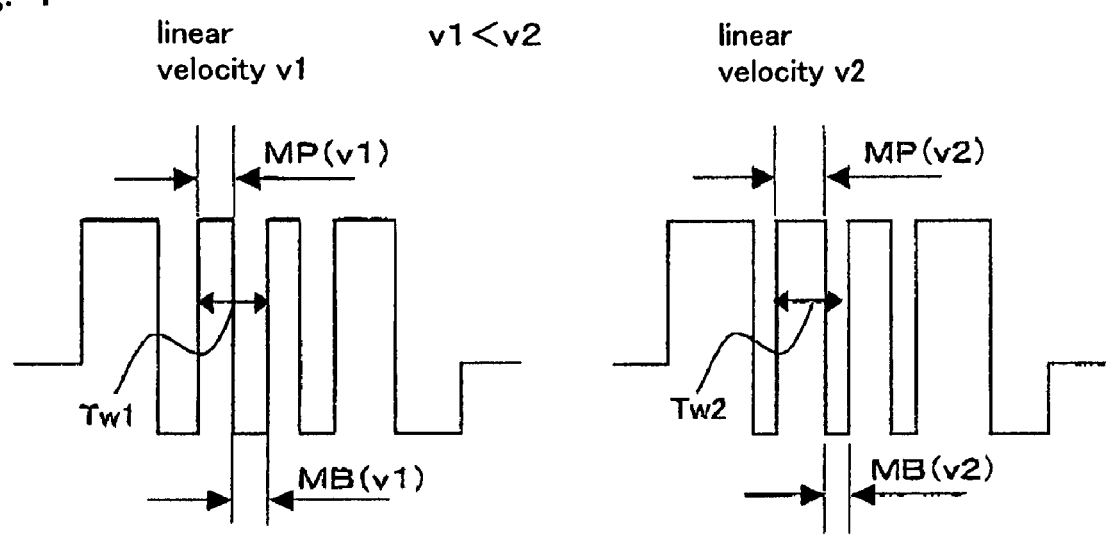
FIG. 4 is an explanatory view of a method for changing a ratio of a multi-pulse width to a fall width in correspondence with the linear velocity.
Figure 5:
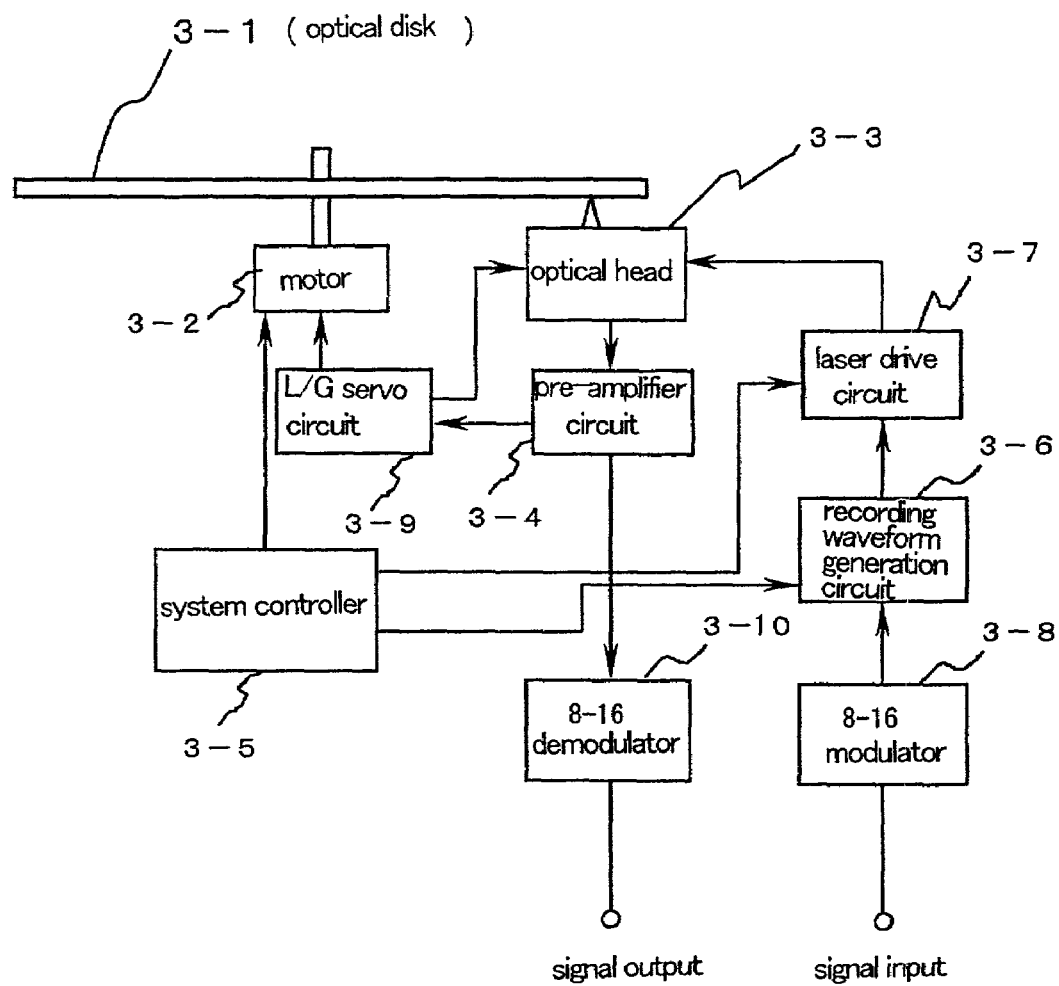
FIG. 5 is an exemplary view showing a constitution of an optical disk unit according to the present invention.

FIG. 5 is an exemplary diagram showing a constitution of an optical disk unit according to the present invention. An optical disk 3-1 of diameter at 12 cm was prepared to perform recording and regeneration of information. This optical disk is a phase change type optical disk in which all recordable regions have a good jitter at a linear velocity of 8.2 m/s. An operation of this optical disk unit will be described below. Note that, as a method for controlling a motor 3-2 when recording and regeneration are performed, the ZCAV system was adopted for changing a linear velocity of a disk and a clock frequency in each zone to which recording and regeneration are performed. Herein, although the clock frequency was generated from a wobble signal, effects of the present invention do not depend on a method for generating the clock frequency.

Information from an external unit of a recorder is transmitted to an 8–16 modulator 3-8 with 8 bits as 1 unit. When the information is recorded on the recording medium 3-1, recording was performed by use of a recording system for converting information 8 bits to 16 bits, a so-called 8–16 modulation system. According to this modulation system, the information having a mark length of 3Tw to 14Tw corresponding to the 8-bit information is recorded. In the drawing, the 8–16 modulator 3-8 performs the modulation.

A digital signal of 3Tw to 14Tw which is converted by the 8–16 modulator 3-8 is transferred to a recording waveform generation circuit 3-6, in which a width of a high power pulse is set as about Tw/2, and while a laser at a high power level is irradiated, a laser at a low power level of a width about Tw/2 is irradiated, and a laser at an intermediate power level is irradiated on between a series of high power pulses, thus generating multi-pulse recording waveforms. At this time, the high power (recording power) level for forming a record mark, the intermediate power (erasing power) level capable of erasing the record mark, and the low power level lower than the erasing power level are changed in accordance with the linear velocity. Furthermore, the recording waveform generation circuit 3-6, the signal of 3Tw to 14Tw is made to correspond to "0" and "1" alternately in time series. In the case of "0," the laser power at the erasing power level is irradiated, and in the case of "1," a series of recording power pulse strings including the pulses at the high power level are irradiated. At this time, a region where laser beams at the erasing power level on the optical disk 3-1 are irradiated is crystallized (space portion), and a pulse region at the recording power level is changed to an amorphous part (mark portion). Furthermore, the recording waveform generation circuit 3-6 has a multi-pulse waveform table in correspondence with a system (adaptive type recording waveform control) in which, when the series of high power pulse strings including the recording power level for forming the mark portion are formed, the front pulse width and the last pulse width of multi-pulse waveforms are changed according to the length of the front and rear space parts of the mark portion. Thus, multi-pulse recording waveforms capable of excluding influence of inter-mark thermal interference generated between the marks as much as possible are generated. The adaptive type recording waveforms were controlled for the disk by time division at $\frac{1}{16}$ of the window width which is an inverse number of the clock frequency in correspondence with each linear velocity. Furthermore, a reflection ratio of this disk is higher in a crystalline state, and the reflection ratio of the region that became an amorphous state by recording is lower.

The recording waveforms generated by the recording waveform generation circuit 3-6 are transferred to a laser drive circuit 3-7, which allows semiconductor laser in an optical head 3-3 to emit light based on these waveforms. In the optical head 3-3 mounted on this recorder, the semiconductor laser having a wavelength of 659 nm is used as information recording energy beams. Moreover, these laser beams are focused on a recording layer of the recording medium by an objective lens of an NA 0.6 to irradiate the energy laser beams corresponding to the recording waveforms, thus the information was recorded.

Furthermore, this recorder corresponds to a system (a so-called land groove (L/G) recording system) for recording information in both a groove and a land (a region between the grooves). In this record, it is possible to select optionally a tracking with respect to the land and the groove by an L/G servo circuit 3-9.

The regeneration of the recorded information was also made by use of the optical head 3-3. The laser beams are irradiated on the recorded mark to detect reflected beams from the mark and a portion other than the mark, thus obtaining a regeneration signal. An amplitude of this regeneration signal is increased by a pre-amplifier circuit 3-4, and a 8–16 demodulator 3-10 converts to 8-bit information in each 16 bits. The regeneration of the recorded mark is completed by the above operations.

In the case where the recording was performed on the above condition, a mark length of 3Tw mark as a shortest mark is about 0.42 $\mu$m, and a mark length of 14Tw mark as a longest mark is about 1.96 $\mu$m. The recording signal includes dummy data of repetition of 4Tw mark and 4Tw space at an initial portion and a terminal portion of an information signal. VFO is included in the initial portion.

In such a recording method, if new information is recorded by overwriting without erasing a portion where any information has already been recorded, the portion is overwritten to the new information. That is, it is possible to overwrite by a single optical spot of a substantial circle. However, at a first one rotation or a plurality of rotations of a disk at the time of overwriting, continuous beams at an intermediate power level or at a power level close thereto of the recording laser beams, which are modulated in power, are irradiated, and the recorded information is once erased, and thereafter at the next one rotation, between a low power level (1.5 mW) and a high power level, or between an intermediate power level and the high power level, the laser beams modulated in power according to the information signal may be irradiated to record information. In this manner, if the recording is made after the information is erased, the written information that is left unerased is few.

First, an EFM signal was recorded at a radius of 23 mm. A linear velocity was set as about 8.2 m/s. A recording power was set as 10 mW, an erasing power was set as 4 mW, and a fall power of a multi-pulse and a low power level existing after a last pulse were set as 4 mW same as the erasing power. Furthermore, a ratio of the multi-pulse between a front pulse and the last pulse to the fall pulse therebetween was set as 1:1. The jitter was 8% in the land and 8.3% in the groove at this time, which indicated a good jitter that can be satisfied practically. Herein, the jitter hereinafter indicates a square mean value of jitter values of a front edge and a rear edge. A window width in jitter measurement is made to be equal to a window width Tw as an inverse number of the clock frequency, and a shortest recording signal is 3Tw and a longest recording signal is 14Tw, which are recorded at random. A regeneration equivalent circuit was used for these measurements.

Figure 6:
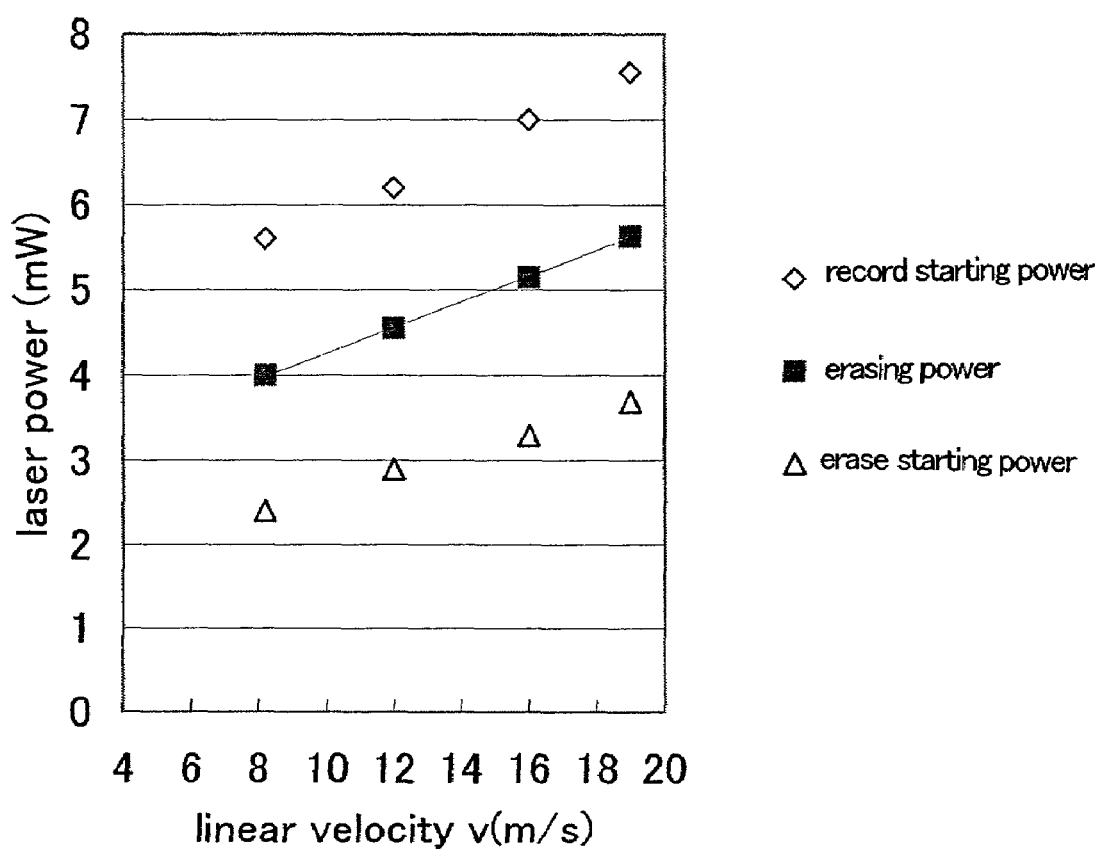
FIG. 6 is a graph showing one example of a relationship between the linear velocity and an erasing power, an erase starting power and a record starting power.

Next, in order to record at different radius, a record erasing characteristic depending on the difference of radius (difference of the linear velocity) was examined. First, the erasing characteristic at radiuses 33.7 mm and 44.9 mm was examined. The linear velocity becomes 12 m/s and 16 m/s. Then, a change of the erasing power depending on the difference of the linear velocities (disk radiuses) of this disk was examined, and as shown in FIG. 6, it was found out that the erasing power increased as the linear velocity accelerated. Herein, an erasing power Pe was set as an intermediate power of the laser power (erase starting power) in which the record mark begins to be erased at each linear velocity and the power (record starting power) in which the record mark begins to be recorded.

Figure 7:
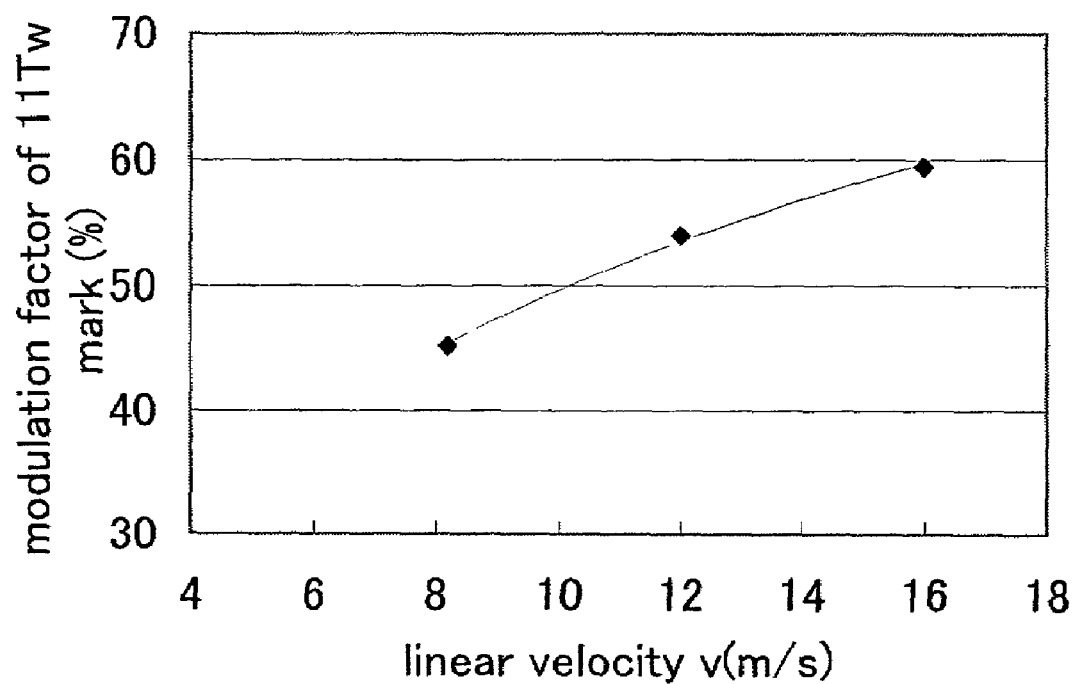
FIG. 7 is a graph showing one example of a relationship between the linear velocity and a demodulation factor of 11Tw mark.

It was found out from this experiment that a relationship between the erasing power Pe and the linear velocity v is represented by Pe=β×v+β'. In this embodiment, β value is 0.15 (mW·s/m), and β' value was 2.8(mW). From this relationship, the erasing power at radius 33.7 mm was set to be 4.55 mW which is 1.14 times the erasing power at radius 23 mm, and the erasing power at radius 44.9 mm was set to be 5.15 mW which is 1.29 times the erasing power at radius 23 mm. Herein, in the case where the recording power was increased at the same ratio as the erasing power, the recording power at radius 33.7 mm is 11.4 mW and the recording power at radius 44.9 mm is 12.9 mW. Recording of 11Tw mark was made by use of this recording power and the above-described erasing power. Tw is the window width in correspondence with the inverse number of the clock frequency that changes in accordance with each linear velocity, and Tw at 8.2 m/s is 17.1 ns, 11.7 ns at 12 m/s, and 8.76 ns at 16 m/s. FIG. 7 shows a modulation factor at each linear velocity when recording 11Tw mark. The calculation of the modulation factor (Mod) was carried out in accordance with the following formula:

Mod(%)=100×(Ic−Ia)/Ic

Figure 8:
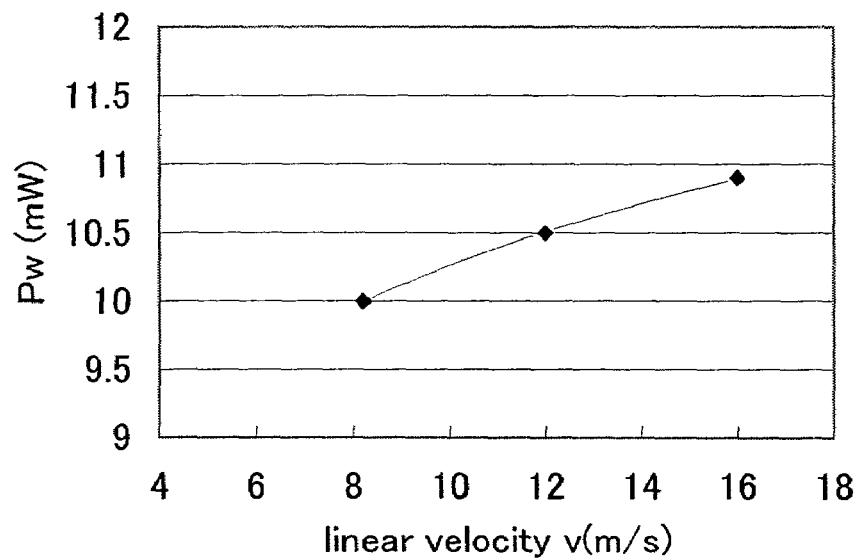
FIG. 8 is a graph showing one example of a relationship between the linear velocity and an optimal recording power.
Figure 9:
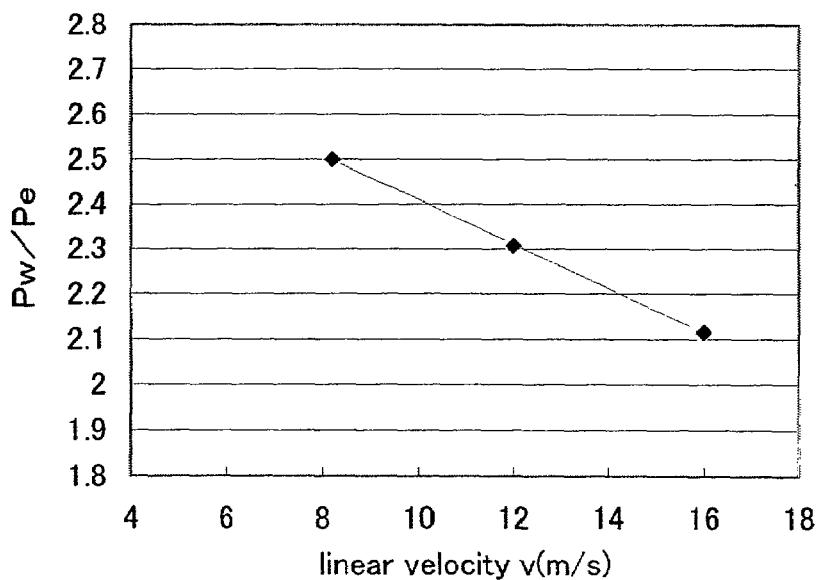
FIG. 9 is a graph showing one example of a relationship between the linear velocity and a ratio of a recording power to the erasing power.

Herein, Ic is a highest level of the reflection ratio in a crystal (erasing) state when recording a signal, and Ia is a lowest level of the reflection ratio in an amorphous (recording) state when recording a signal. From FIG. 7, it was understood that the modulation factor increases as the linear velocity accelerates. This shows that as the linear velocity accelerates, the record mark width increases. This is because a re-crystallization region to be generated in a periphery of the record mark is narrowed by accelerating the linear velocity. It is desirable that the record mark width is constant even if the linear velocity changes. In order to obtain the record mark of the same width (the same modulation factor) at any radius of the disk, if the recording power at each linear velocity is set, the result was obtained as shown in FIG. 8. A relationship between the recording power Pw and the linear velocity can be represented by Pw=α×v+α', and in this embodiment, α value was 0.12 (mW·s/m) and α' was 9(mW). From these experiments, as shown in FIG. 9, it was understood that a relationship between Pw and Pe at each linear velocity v can be represented by Pw/Pe=γ×v+γ'. In this embodiment, γ value is −0.05 (s/m) and γ' is 2.9.

When these relational formulas were stored in the optical disk unit according to the present invention, and 11Tw (window width Tw=14.0 ns) mark was recorded at radius 28 mm (10 m/s), the modulation factor became about 45%, and the same value as the modulation factor at radius 23 mm could be obtained. When several types of optical disks having different crystallization characteristics of the thermal structure and the recording film were examined similarly, α, α', β, β', γ, γ' took different values, respectively. There was a tendency that α, β increased in a quick cooling structure disk and decreased in a gradual cooling structure disk. In the disk in which α is smaller than 0.05, a cooling speed of the recording film was too slow to form a good mark. For the same reason, in the disk in which β is smaller than 0.1, the formation of the good mark was difficult. Furthermore, in the disk in which α is greater than 0.5 (mW·s/m), the cooling speed of the recording film was fast, and there occurred a problem that a retention lifetime of the recorded data reduced. In the case where β is greater than 0.2 also, the same problem occurred. Accordingly, when units of α, β are mW·s/m, 0.05≦α≦0.5 and 0.1≦β≦0.3 are preferable respectively. Furthermore, when α, β are 0.07≦α≦0.3 and 0.12≦β≦0.2 respectively, compatibility with the manufactured products was good, which was preferable. Furthermore, when γ was in the range of −0.01 and −0.1, compatibility with the manufactured products was good, which was preferable. Such information is stored in a system controller 3-5, thereby more prompt recording is possible.

Next, there is shown a recording waveform table used when recording the EFM signal at radius 23 mm (linear velocity 8.2 m/s and window width 17.1 ns). Table 1 is a shift amount of the front pulse in each mark, and Table 2 is a shift amount of a last pulse in each mask. In either table, unit is a time (1/16*Tw) obtained by dividing the window width Tw by 16. Space 3Tw, Space 4Tw, Space 5Tw and Space 6Tw displayed vertically indicate the length of the space preceding or succeeding the record marks shown laterally, and in the case where the space of length of 6Tw or more comes to prior to or behind the recording pulse, the same front pulse width and last pulse width as Space 6Tw are obtained. Similarly, in the case of the mark having the length of 6Tw mark or more, the same front pulse width and last pulse width as Mark 6T are obtained. The 3Tw mark is shaped such that the front pulse is integrated with the last pulse. The recording waveform control uses an adaptive type recording waveform control that is carried out in the DVD-RAM of 4.7 GB. The laser power was, as described above, set as the recording power 10 mW and the erasing power 4 mW. The jitter was 8% in the land and 8.3% in the groove.

Thereafter, the optical head was moved to radius 44.9 mm (linear velocity 16 m/s), and the EFM signals were recorded by use of the recording waveform tables of Table 3 and Table 4 shown below. The recording power and erasing power were 10.9 mW and 5.15 mW, respectively. As a result, the jitter was 8.5% in the land, and 8.6% in the groove, and the substantially same good jitter as in the linear velocity of 8.2 m/s could be obtained.

When comparing Table 1 with Table 3, a correction is made such that the recording pulse width used in the linear velocity 16 m/s is wider than that used in the linear velocity 8.2 m/s, and also the shorter the record mark, the larger the correction. For example, paying attention to the mark following the 4Tw space, the front pulse width of the 4Tw mark at 8.2 m/s is 24 with 1/16*Tw as unit, and the front pulse width of the 5Tw mark is 23. On the other hand, the front pulse width of the 4Tw mark at 16 m/s is 26 with 1/16*Tw as unit, and the front pulse width of the 5Tw mark is 24. With acceleration of the linear velocity accelerates, so that the front pulse width of the 4Tw mark is wider by 1/8*Tw, and the front pulse width of the 5Tw mark is wider by 1/16*Tw. Furthermore, the correction is wider by 1/16*Tw in the 4Tw mark than in the 5Tw mark.

Moreover, with regard to the last pulse width, both of the last pulse widths of the 4Tw mark and 5Tw mark at 8.2 m/s are 12 with 1/16*Tw as unit. On the other hand, the last pulse width of the 4Tw mark at 16 m/s is 14 with 1/16*Tw as unit, and the last pulse width of the 5Tw mark is 13. With acceleration of the linear velocity, the last pulse width of the 4Tw mark is wider by 1/8*Tw, and the last pulse width of the 5Tw mark is wider by 1/16*Tw. Furthermore, the correction is wider by 1/16*Tw in the 4Tw mark rather than in the 5Tw mark.

In this manner, the correction is made so as to widen the recording pulse as the linear velocity accelerates, and the control is carried out such that the shorter the record mark, the greater the correction, thus the good jitter can be obtained even if recording is made while the linear velocity changes.

As a comparative example, in the case of a radius of 44.9 mm (linear velocity 16 m/s), when the recording waveform tables (Table 1 and Table 2) for radius 23mm (linear velocity 8.2 m/s) were used, the jitter was 14% in the land and 16% in the groove, which rose greatly comparing to the recording jitter at the linear velocity 8.2 m/s.

Next, at the radius 44.9 mm (liner velocity 16 m/s), a ratio of the multi-pulse width between the front pulse and the last pulse to the fall width therebetween was changed for recording, in the case where the multi-pulse width was ½Tw and the fall width was ½Tw, the jitter was 8.5% in the land and 8.6% in the groove. On the other hand, in the case where the multi-pulse width was 9/16Tw and the fall width was 7/16Tw, even better jitter could be obtained, which was 8.2% in the land and 8.2% in the groove. As described above, the multi-pulse width: the fall width at the radius 23 mm (8.2 m/s) is 1:1, and the ratio at the radius 44.9 mm (linear velocity 16 m/s) is 9:7. In this manner, the multi-pulse width/fall width when the linear velocity is fast is made to be larger than that when the linear velocity is slow for recording, thereby obtaining even better jitter.

TABLE 1

Front pulse Width at Linear Velocity 8.2 m/s

|  | Mark 3 Tw | Mark 4 Tw | Mark 5 Tw | Mark 6 Tw |
|---|---|---|---|---|
| Space 3 Tw | 26 | 25 | 23 | 22 |
| Space 4 Tw | 25 | 24 | 23 | 22 |
| Space 5 Tw | 25 | 24 | 23 | 22 |
| Space 6 Tw | 25 | 24 | 23 | 22 |

TABLE 2

Last pulse Width at Linear Velocity 8.2 m/s

|  | Mark 3 Tw | Mark 4 Tw | Mark 5 Tw | Mark 6 Tw |
|---|---|---|---|---|
| Space 3 Tw | 11 | 11 | 11 | 11 |
| Space 4 Tw | 12 | 12 | 12 | 13 |
| Space 5 Tw | 12 | 12 | 12 | 12 |
| Space 6 Tw | 12 | 12 | 12 | 12 |

TABLE 3

Front pulse Width at Linear Velocity 16 m/s

|  | Mark 3 Tw | Mark 4 Tw | Mark 5 Tw | Mark 6 Tw |
|---|---|---|---|---|
| Space 3 Tw | 29 | 27 | 24 | 22 |
| Space 4 Tw | 28 | 26 | 24 | 22 |
| Space 5 Tw | 28 | 26 | 24 | 22 |
| Space 6 Tw | 28 | 26 | 24 | 22 |

TABLE 4

Last pulse Width at Linear Velocity 16 m/s

|  | Mark 3 Tw | Mark 4 Tw | Mark 5 Tw | Mark 6 Tw |
|---|---|---|---|---|
| Space 3 Tw | 14 | 13 | 12 | 11 |
| Space 4 Tw | 15 | 14 | 13 | 13 |
| Space 5 Tw | 15 | 14 | 13 | 12 |
| Space 6 Tw | 15 | 14 | 13 | 12 |

According to the present invention, it is possible to provide the information recording method and optical disk unit which control a shape change of the record mark in accordance with the linear velocity change and the edge shift generated from a change of the thermal interference condition in the track direction at a minimum even when the linear velocity is made to be variable, and have the good jitter. Furthermore, in the ZCLV system, in order to make the linear velocity to be in a substantially constant state, the disk rotation velocity must be changed between the inner and outer peripheries of the disk, and for this reason, a power for changing the disk rotation velocity has been consumed. However, in the optical disk unit according to the present invention, it is possible to make the disk rotation velocity to be substantially constant and to reduce the power consumption. Moreover, in the case where the linear velocity accelerates, a transfer rate also can be increased.

Although the preferred embodiments of the present invention have been described in detail, it should be understood that various changes, substitutions and alternations can be made therein without departing from spirit and scope of the inventions as defined by the appended claims.

What is claimed is:

1. An information recording method for recording information on an optical disk having a recording layer of phase changing type, in a variable linear velocity so as to correspond the information to an edge of a record mark to be formed when an optical pulse is irradiated on said optical disk, wherein, when a window width at a first linear velocity v1 is nTw (where n is an integer), the window width at a second linear velocity v2 faster than the first linear velocity v1 is mTw (where m is an integer), a pulse width of the optical pulse to be irradiated when forming the record mark at said first linear velocity v1 is P1, the pulse width of the optical pulse to be irradiated when forming the same record mark as in said first linear velocity v1, at said second linear velocity v2, is P2, such that P1<P2 is satisfied, wherein the window width is an inverse number of a clock frequency at one of the first linear velocity and the second linear velocity, and wherein for a record mark of a first length, (P2/mTw)–(P1/nTw) equals a first value, and for a record mark of a second length which is shorter than the first length, (P2/mTw)–(P1/nTw) has a second value which is greater than the first value.

2. The information recording method according to claim 1, wherein said optical disk is a phase change disk having said recording layer of phase changing type.

3. An information recording method for recording information on an optical disk having a recording layer of phase changing type, in a variable linear velocity so as to correspond the information to an edge of a record mark to be formed when an optical pulse is irradiated on said optical disk, wherein, when a power of an optical pulse to be irradiated when erasing the record mark at a first linear velocity v1 is Pe1(mW), a power of the optical pulse to be irradiated when forming the record mark at the first linear velocity v1 is Pw1(mW), a power of the optical pulse to be irradiated when erasing the record mark at a second linear velocity v2 faster than the first linear velocity v1 is Pe2(mW), and a power of the optical pulse to be irradiated when forming the record mark at the second linear velocity v2 is Pw2(mW), such that Pw1/Pe1>Pw2/Pe2 is satisfied;

wherein, when a window width at the first linear velocity v1 is nTw (where n is an integer), the window width at the second linear velocity v2 faster than the first linear velocity v1 is mTw (where m is an integer), a pulse width of an optical pulse to be irradiated when forming the record mark at said first linear velocity v1 is P1, and the pulse width of the optical pulse to be irradiated when forming the same record mark as in said first linear velocity v1, at the second linear velocity v2, is P2, such that P1<P2 is satisfied;

wherein the window width is an inverse number of a clock frequency at one of the first linear velocity and the second linear velocity; and wherein for a record mark of a first length, (P2/mTw)−(P1/nTw) equals a first value, and for a record mark of a second length which is shorter than the first length, (P2/mTw)−(P1/nTw) has a second value which is greater than the first value.

4. The information recording method according to claim 3, wherein said optical disk is a phase change disk having said recording layer of phase changing type.

5. An optical disk unit for recording information so as to correspond the information to an edge of a record mark, comprising:

an optical head provided with a light source for irradiating light on an optical disk having a recording layer of phase changing type;

an optical detector for detecting light reflected from said optical disk;

optical head drive means for driving said optical head with respect to the optical disk;

disk drive means for driving the optical disk for rotation; and recording waveform generating means for generating a recording waveform to drive said light source, wherein said disk drive means sets a linear velocity at a position of the optical head to be variable and drives the optical disk for rotation;

wherein, in an optical pulse to be irradiated from the light source on the optical disk, a window width at a first linear velocity v1 is nTw (where n is an integer), the window width at a second linear velocity v2 faster than the first linear velocity is mTw (where m is an integer), a pulse width of the optical pulse to be irradiated when forming the record mark at the first linear velocity v1 is P1, and the pulse width of the optical pulse to be irradiated when forming the same record mark as in the first linear velocity v1, at the second linear velocity v2, is P2, such that P1<P2 is satisfied;

wherein the window width is an inverse number of a clock frequency at one of the first linear velocity and the second linear velocity; and wherein for a record mark of a first length, (P2/mTw)−(P1/nTw) equals a first value, and for a record mark of a second length which is shorter than the first length, (P2/mTw)−(P1/nTw) has a second value which is greater than the first value.

6. The optical disk unit according to claim 5, wherein said optical disk is a phase change disk having said recording layer of phase changing type.

7. An optical disk unit for recording information so as to correspond the information to an edge of a record mark, comprising:

an optical head provided with a light source for irradiating light on an optical disk having a recording layer of phase changing type;

an optical detector for detecting light reflected from said optical disk; optical head drive means for driving said optical head with respect to the optical disk;

disk drive means for driving the optical disk for rotation; and recording waveform generating means for generating a recording waveform to drive said light source, wherein said disk drive means sets a linear velocity at a position of said optical head to be variable and drives the optical disk for rotation;

wherein, in an optical pulse to be irradiated from said light source on the optical disk, when a power of the optical pulse to be irradiated when erasing the record mark at a first linear velocity v1 is Pe1(mW), the power of the optical pulse to be irradiated when forming the record mark at the first linear velocity v1 is Pw1(mW), the power of the optical pulse to be irradiated when erasing the record mark at a second linear velocity v2 faster than the first linear velocity v1 is Pe2(mW), and the power of the optical pulse to be irradiated when forming the record mark at the second linear velocity v2 is Pw2(mW), such that Pw1/Pe1>Pw2/Pe2 is satisfied; and in the optical pulse to be irradiated on the optical disk from said light source, when the window width at the first linear velocity v1 is nTw (where n is an integer), the window width at the second linear velocity faster than the first linear velocity is Tw2, the pulse width of the optical pulse to be irradiated when forming the record mark at said first linear velocity v1 is P1, and the pulse width of the optical pulse to be irradiated when forming the same record mark as in said first linear velocity v1, at said second linear velocity v2, is P2, such that P1<P2 is satisfied;

wherein the window width is an inverse number of a clock frequency at one of the first linear velocity and the second linear velocity; and wherein for a record mark of a first length, (P2/mTw)−(P1/nTw) equals a first value, and for a record mark of a second length which is shorter than the first length, (P2/mTw)−(P1/nTw) has a second value which is greater than the first value.

8. The optical disk unit according to claim 7, wherein said optical disk is a phase change disk having said recording layer of phase changing type.

* * * * *